US012780602B2

(12) United States Patent
Kang et al.

(10) Patent No.: US 12,780,602 B2
(45) Date of Patent: Nov. 3, 2026

(54) METHOD AND SYSTEM FOR CONTROLLING ELEVATOR CAR

(71) Applicant: HYUNDAI ELEVATOR CO., LTD., Chungcheongbuk-do (KR)

(72) Inventors: DongHo Kang, Chungcheongbuk-do (KR); MoonSu Kim, Chungcheongbuk-do (KR); Donghyun Kwon, Chungcheongbuk-do (KR)

(73) Assignee: Hyundai Elevator Co., Ltd., Chungcheongbuk-Do (KR)

( * ) Notice: Subject to any disclaimer, the term of this patent is extended or adjusted under 35 U.S.C. 154(b) by 484 days.

(21) Appl. No.: 18/529,734

(22) Filed: Dec. 5, 2023

(65) Prior Publication Data

US 2024/0400348 A1 Dec. 5, 2024

(30) Foreign Application Priority Data

May 30, 2023 (KR) ........................ 10-2023-0069511
Aug. 29, 2023 (KR) ........................ 10-2023-0113264

(51) Int. Cl.
*B66B 1/46* (2006.01)

(52) U.S. Cl.
CPC ........ *B66B 1/468* (2013.01); *B66B 2201/222* (2013.01)

(58) Field of Classification Search
CPC ......... B66B 1/2458; B66B 1/06; B66B 1/468; B66B 1/3423; B66B 1/3446; B66B 5/0012; B66B 2201/103
USPC .......................................................... 187/380
See application file for complete search history.

(56) References Cited

U.S. PATENT DOCUMENTS

2021/0284485 A1* 9/2021 Nichols ................. B66B 1/2408
2022/0017332 A1* 1/2022 Kim ........................ B66B 13/14

FOREIGN PATENT DOCUMENTS

| | | | |
|---|---|---|---|
| CN | 112537703 | A | 3/2021 |
| CN | 114852807 | A | 8/2022 |
| JP | 2012196731 | A | 10/2012 |
| JP | 2013216408 | A | 10/2013 |
| JP | 2022-019590 | A | 1/2022 |
| KR | 10-2022-0009078 | | 1/2022 |
| KR | 10-2022-0139528 | | 10/2022 |

OTHER PUBLICATIONS

Kang et al. (KR 102473630 B1), Robot-Friendly Building (Year: 2022).*
Munyong et al. (KR 20220139528 A) Elevator Control System and Method for Controlling Elevator Which Robot and Human Board (Year: 2022).*

* cited by examiner

*Primary Examiner* — Jorge L Carrasquillo
(74) *Attorney, Agent, or Firm* — McDonnell Boehnen Hulbert & Berghoff LLP

(57) ABSTRACT

An elevator car control method includes: receiving a hall call from a first robot, the hall call including an indicator indicating the number of two or more robots and a destination floor, checking interior spaces of elevator cars based on interior images of the elevator cars; assigning an elevator car to the hall call based on the interior spaces of the elevator cars; receiving an under-boarding signal from a second robot; receiving a boarding completion signal from a third robot different from the second robot; and moving the elevator car to the destination floor.

16 Claims, 7 Drawing Sheets

METHOD AND SYSTEM FOR CONTROLLING ELEVATOR CAR

CROSS-REFERENCE TO RELATED APPLICATION

This application claims the benefit of Korean Patent Applications No. 10-2023-0069511, filed on May 30, 2023, and No. 10-2023-0113264, filed on Aug. 29, 2023, the entire disclosures of which are incorporated by reference for all purposes as if fully set forth herein.

FIELD

Embodiments of the present disclosure relate to a method and system for controlling an elevator car.

BACKGROUND

Robots used to provide services within a building are transported to their destination floors using elevator cars installed within the building. When multiple robots perform the same task, for example, when two robots each deliver five items to an office on one floor, both robots need to board one elevator car to move to the corresponding floor.

RELATED LITERATURE

Patent Document

Korean Patent Registration No. 10-2451123
Korean Patent Registration No. 10-2541959
Korean Patent Registration No. 10-2558417

SUMMARY

Embodiments of the present disclosure provide a method and system for controlling an elevator car to allow multiple robots to board one elevator car when the multiple robots need to perform the same task.

In accordance with one aspect of the present disclosure, an elevator car control method includes: receiving a hall call from a first robot, the hall call including an indicator indicating the number of two or more robots and a destination floor; checking interior spaces of elevator cars based on interior images of the elevator cars; assigning an elevator car to the hall call based on the interior spaces of the elevator cars; receiving an under-boarding signal from a second robot; receiving a boarding completion signal from a third robot different from the second robot; and moving the elevator car to the destination floor.

In one embodiment, the first robot and the second robot may be different robots.

In one embodiment, the first robot and the second robot may be the same robot.

In one embodiment, the elevator car control method may further include controlling the elevator car so as not to be assigned in response to a hall call from a passenger, after assigning the elevator car.

In one embodiment, the number of two or more robots may be N, where N is 3, and the step of assigning an elevator car based on the interior spaces of the elevator cars may include: determining that there is no elevator car available to N robots; determining that there is an elevator car available to N−1 robots; and assigning the elevator car available to N−1 robots.

In one embodiment, the hall call may further include information about the first to third robots; the elevator car control method may further include receiving hall calls from the second and third robots; and the step of assigning an elevator car based on the interior spaces of the elevator cars may include assigning the elevator car in response to only one of the hall calls from the first to third robots.

In one embodiment, the step of assigning an elevator car to the hall call based on the interior spaces of the elevator cars may include assigning the elevator car to the hall call by taking into account an operation mode of the elevator car, the operation mode including a robot exclusive mode and a robot/passenger share mode.

In one embodiment, the step of assigning an elevator car to the hall call based on the interior spaces of the elevator cars may include prioritizing assignment of an elevator car in the robot exclusive mode.

In accordance with another aspect of the present disclosure, an elevator car control method includes: operating a first elevator car by setting an operation mode of the first elevator car to a robot exclusive mode; operating a second elevator car by setting an operation mode of the second elevator car to a robot/passenger share mode; receiving a hall call from a first robot, the hall call including an indicator indicating the number of two or more robots and a destination floor; obtaining an occupation rate of the first elevator car; obtaining an occupation rate of the second elevator car; and assigning an elevator car to the hall call based on at least one of the occupation rate of the first elevator car, the occupation rate of the second elevator car, the operation modes, and a preset reference.

In one embodiment, the elevator car control method may further include: receiving an under-boarding signal from the second robot; receiving a boarding completion signal from a third robot different from the second robot; and moving the elevator car to the destination floor, after assigning an elevator car to the hall call.

In accordance with a further aspect of the present disclosure, a control method by a robot control system includes: receiving a grouping request signal; grouping multiple robots into one group in response to the grouping request signal; transmitting a grouping signal including information about the grouped robots; transmitting a signal for notification of the grouped robots to an elevator car control system; moving the grouped robots to board an elevator car; transmitting a hall call to the elevator car control system, the hall call including an indicator indicating the number of grouped robots; and receiving an under-boarding signal from one of the multiple robots; and receiving a boarding completion signal from one of the multiple robots.

In one embodiment, the step of transmitting a hall call to the elevator car control system may include: receiving hall calls from the multiple robots, the hall calls including robot information; and filtering out duplicate hall calls among the hall calls received from the multiple robots based on the grouping signal and the hall calls.

In one embodiment, the control method may further include transmitting a robot selection signal to either the grouped robots or any one of the grouped robots to select a robot that will transmit the hall call, after grouping the multiple robots into one group in response to the grouping request signal.

In accordance with yet another aspect of the present disclosure, an elevator car control system includes a processor and a memory configured to store instructions. When executed, the instructions enable the processor to: receive a hall call including an indicator indicating the number of two or more robots and a destination floor; determine occupation rates of elevator cars based on internal images of the elevator cars; assign an elevator car to the hall call based on the occupation rates of the elevator cars; receive an under-boarding signal from a robot; receive a boarding completion signal from a robot different from the robot; and move the elevator car to the destination floor.

In one embodiment, the processor may be configured so as not to assign the elevator car in response to a hall call from a passenger after assigning the elevator car.

In accordance with yet another aspect of the present disclosure, an elevator car control system includes: multiple elevator cars; a camera disposed within each of the elevator cars and acquiring an interior image of each of the elevator cars; a processor generating a control signal to control operation of each of the elevator cars in response to a request signal received from a robot, wherein the processor is configured to: receive a hall call from one robot, the hall call including a destination floor and an indicator indicating multiple robots included in one group; assign an elevator car for transporting the multiple robots to the hall call based on the interior image of each of the elevator cars; and allow the elevator car for transporting the multiple robots to accommodate the multiple robots and to move to the destination floor.

The method and system for controlling an elevator car according to embodiments of the present disclosure can improve robot transfer efficiency when two or more robots move to the same location with the same purpose by allowing multiple robots to board the same elevator car and move to a destination floor.

BRIEF DESCRIPTION OF THE DRAWINGS

The above and other aspects, features, and advantages of the present disclosure will become apparent from the detailed description of the following embodiments in conjunction with the accompanying drawings.

DETAILED DESCRIPTION OF EMBODIMENTS

Figure 1:
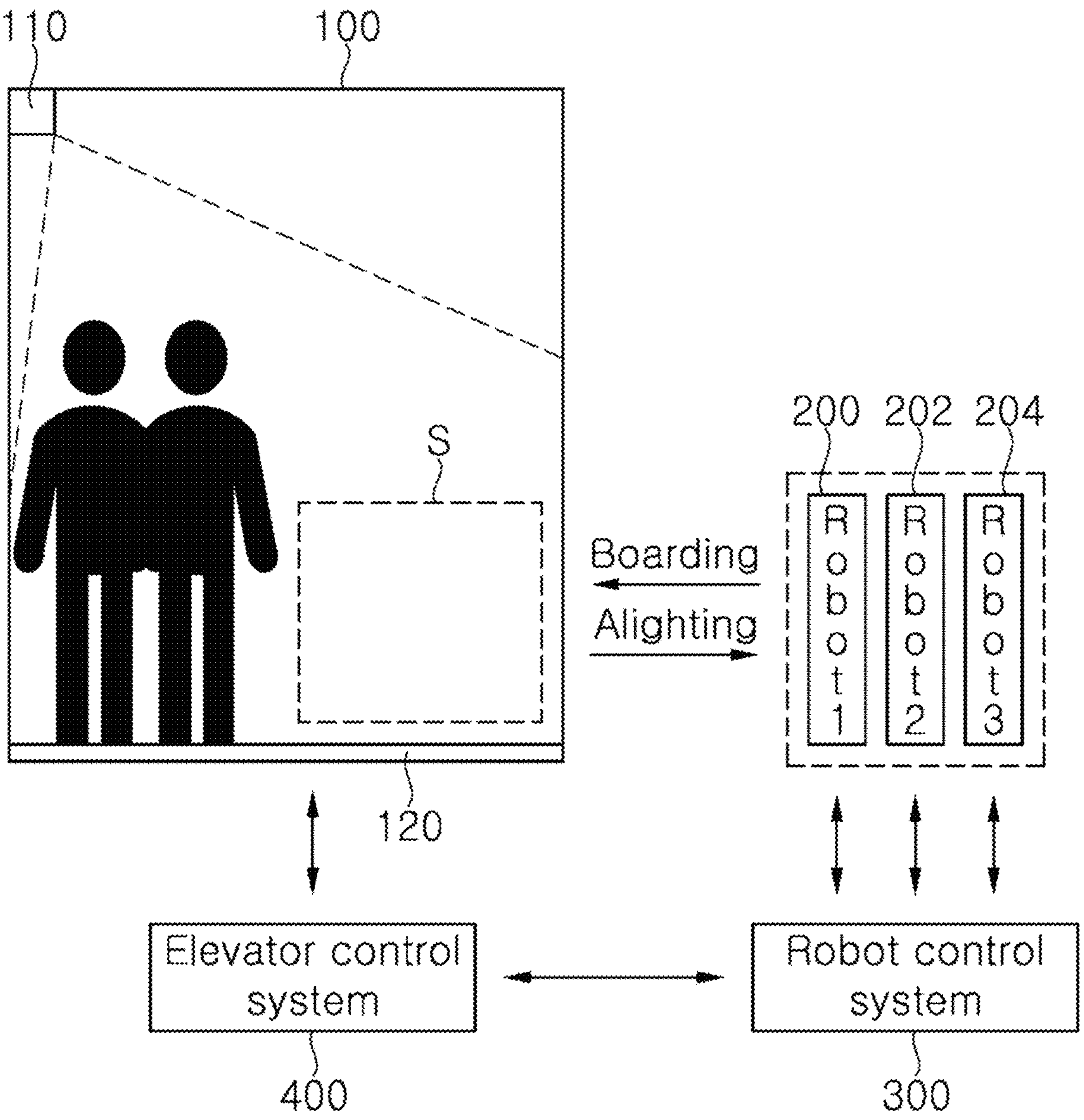
FIG. 1 is an exemplary view of an elevator car control environment according to an embodiment of the present disclosure.

Hereinafter, exemplary embodiments of the present disclosure will be described in detail with reference to the accompanying drawings such that the present disclosure can be easily realized by those skilled in the art. It should be understood that the present disclosure may be embodied in different ways and is not limited to the following embodiments.

In the drawings, portions irrelevant to the description will be omitted for clarity and like components will be denoted by like reference numerals throughout the specification.

In addition, it will be understood that the terms “includes”, “comprises”, “including” and/or “comprising,” when used in this specification, specify the presence of stated features, steps, operations, elements, and/or components, but do not preclude the presence or addition of one or more other features, steps, operations, elements, components, and/or groups.

It will be understood that the invention described in this disclosure is not intended to be limited to any particular embodiment, and includes various modifications, equivalents and/or alternatives to the embodiments of the present disclosure.

As used herein, the expression “configured to” may be used interchangeably with, for example, “suitable for,” “having the capacity to,” “designed to,” “adapted to,” “made to,” or “capable of,” depending on the context. The expression “configured (or set up) to” may not necessarily mean “specifically designed (hardware wise) to”. Instead, in a certain context, the expression “a device configured to” may mean that the device is “capable of” doing something in conjunction with other devices or components.

It will be understood that the related literature described in this disclosure is incorporated herein by reference in its entirety and that a person having ordinary skill in the art will be able to apply what is described in the related literature to the matter briefly described herein.

FIG. 1 is an exemplary view of an elevator car control environment according to one embodiment of the present disclosure.

Referring to FIG. 1, an elevator car control environment includes an elevator car 100, robots 1 to 3 (hereinafter referred to as robots) 200, 202, 204 that board the elevator car 100 and move to a destination floor, a robot control system 300 that controls the robots 200, 202, 204, and an elevator car control system 400 that controls the elevator car 100. In one embodiment, the configuration including the elevator car 100 and the elevator car control system 400 may be referred to as an elevator car control system.

When a door of the elevator car 100 opens, the robots 200, 202, 204 can board the elevator car 100. A camera 110 may be disposed inside the elevator car 100 and a weight sensor 120 may be provided to the floor of the elevator car 100. The camera 110 may be configured to acquire images of occupants and/or the robots 200, 202, 204 inside the elevator car 100. The elevator car 100 may determine the number of occupants inside the elevator car 100 and/or the number of robots on board from the images of the camera 110. The weight sensor 120 may be configured to detect the weight of occupants and robots 200, 202, 204 that board the elevator car 100. The images acquired by the camera 110 and the weights detected by the weight sensor 120 may be transmitted to the elevator car control system 400. The elevator car control system 400 may calculate an occupation rate of a boarding space S of the elevator car 100 or an item inside the elevator car 100 based on the images acquired by the camera 110 and/or the weights detected by the weight sensor 120. The elevator car control system 400 may determine the number of occupants inside the elevator car 100 and/or the number of robots on board from the images acquired by the camera 110. In addition, Korean Patent Registration No. 10-2541959 discloses a method for calculating a space occupation rate of an item in an elevator car.

In one embodiment, the elevator car control system 400 may assign a hall call to an elevator car based on a boarding capacity of an elevator car, for example, the maximum occupant capacity of the elevator car, the maximum weight capacity of the elevator car, and the number of occupants and/or robots in the elevator car.

The robots 200, 202, 204 are service robots used to provide services within the building, which will be described in more detail with reference to FIG. 2. Movement of the robots 200, 202, 204 and at least some calls for the elevator car 100 may be achieved by the robot control system 300, which will be described in more detail with reference to FIG. 3. The elevator car control system 400 may be configured to control multiple elevator cars including the elevator car 100. The elevator car control system 400 may, for example, move an appropriate elevator car (for example, the elevator car 100) among the multiple elevator cars to a floor on which the robots 200, 202, 204 are located.

In one embodiment, each of the robots 200, 202, 204 may be equipped with at least some configuration of the robot control system 300. Alternatively, the robots 200, 202, 204 and the robot control system 300 may be physically separated. The robot control system 300 and the robots 200, 202, 204 may be realized by separate servers.

In one embodiment, the robots 200, 202, 204 may be grouped to perform one common task, as shown by a dotted line in FIG. 1, and may move to the same destination floor. For example, it is assumed that one robot can move five items. The robots 200, 202, 204 may simultaneously perform a task of moving 15 items. Accordingly, the robots 200, 202, 204 may be grouped. Preferably, the grouped robots 200, 202, 204 simultaneously board one elevator car and move together to the same destination floor. In other words, when transportation of more than N items is requested for a robot capable of carrying N items, two or more robots may be grouped. Although it is primarily assumed and described in the present disclosure that the number of grouped robots is 3, it will be understood that the number of grouped robots may be 2 or more other than 3.

The robot control system 300 may receive a grouping request signal from an external source. The grouping request signal may include an item carrying signal. The item carrying signal may include the number of items. Based on the number of items and the number of items that one robot can carry, the robot control system 300 may group multiple robots into one group. In the present disclosure, the robots 200, 202, 204 are described as being grouped. The robot control system 300 may transmit a grouping signal to the grouped robots 200, 202, 204. The grouping signal may include robot information (e.g., robot IDs) and task information (e.g., destination, task, and the like). The grouping signal may include information indicating which robots have been grouped.

The robot control system 300 may transmit a signal to the elevator car control system 400, where the signal indicates which robots have been grouped. Accordingly, the elevator car control system 400 may determine which robots have been grouped.

In order for the grouped robots 200, 202, 204 to board the elevator car 100, only one of the robots 200, 202, 204 (hereinafter referred to as robot 200) may transmit an elevator car call command signal (e.g., a hall call) to the elevator car control system 400 through the robot control system 300. The robot that will transmit the hall call may be randomly selected from among the robots 200, 202, 204. The selection of the robot that will transmit the hall call may be performed by the robot control system 300. The robot control system 300 may transmit a signal designating the robot, which will transmit the hall call, to the grouped robots or to a designated robot. For example, a signal selecting the robot that will transmit the hall call may be included in the grouping signal. Alternatively, the robot control system 300 may transmit a signal designating the robot, which will transmit the hall call, separately from the grouping signal to the grouped robots or only to the designated robot.

In one embodiment, among the grouped robots, a robot first arriving at a platform may transmit the hall call on behalf of the grouped robots. Alternatively, based on a unique ID among the grouped robots, one robot (e.g., robot with the lowest or highest ID) may transmit the hall call on behalf of the grouped robots. Alternatively, a robot closest to the door of the elevator car may transmit the hall call.

Accordingly, assignment of an elevator car for boarding of the robots 200, 202, 204 may be achieved by one elevator car call command signal. The hall call may include an indicator indicating the number of robots 200, 202, 204. The hall call may include information about a call floor (robot waiting floor) and a destination floor. Accordingly, the elevator car control system 400 may be controlled to assign an elevator car that all of the robots 200, 202, 204 can board.

Alternatively, even though each of the robots 200, 202, 204 transmits an elevator car call command signal (e.g., hall call) to the elevator car control system 400 through the robot control system 300, the robot control system 300 may only transmit one elevator car call command signal to the elevator car control system 400, or the elevator car control system 400 may assign an elevator car in response to only one elevator car call signal. In other words, the robot control system 300 or the elevator car control system 400 may filter out hall calls transmitted from the multiple robots belonging to one group based on the grouping signal.

In one embodiment, the hall call transmitted by each of the robots 200, 202, 204 may further include robot information (e.g., robot ID and the like). The robot control system 300 or the elevator car control system 400 may determine, based on the robot information included in the hall call and the grouping signal, that each of the grouped robots 200, 202, 204 transmitted the hall call. Upon determining that each of the grouped robots 200, 202, 204 transmitted the hall call, the robot control system 300 or the elevator car control system 400 may perform an elevator car assignment corresponding to one hall call.

In one embodiment, the elevator car control system 400 may assign an elevator car to the grouped robots in consideration of a current operation mode of each elevator car. For example, each of the multiple elevator cars may operate in one of the following modes before the elevator car control system 400 receives hall call(s) from the grouped robot(s): a robot exclusive mode in which call services are available to robots only; a general passenger mode in which call services are available to people only; and a boarding share mode, in which call services are available to both robots and people. On the other hand, there may be elevator cars that do not have a predetermined operation mode.

The elevator car control system 400 may receive a hall call for boarding of multiple robots. The elevator car control system 400 may assign the hall call to an elevator car based on a current operation mode of the elevator car. The elevator car control system 400 may prioritize assignment of the hall call to an elevator car in the robot exclusive mode.

In one embodiment, since only robots can board the elevator car in the robot exclusive mode, the elevator car control system 400 may determine that the elevator car in the robot exclusive mode can accommodate more robots than an elevator car in the robot/passenger share mode. For example, when the elevator car in the robot exclusive mode has the same occupation rate as the elevator car in the robot/passenger share mode, the elevator car control system 400 may prioritize assignment of the elevator car in the robot exclusive mode in response to the hall call for boarding of the multiple robots. When the elevator car in the robot exclusive mode has a lower occupation rate than the elevator car in the robot/passenger share mode and a difference in occupation rate therebetween is less than a preset standard, the elevator car control system 400 may assign the elevator car in the exclusive mode in response to the hall call for boarding of the multiple robots. For example, if the difference in space occupation rate between the elevator car in the robot exclusive mode and the elevator car in the robot/passenger share mode is within 5% or 10%, the elevator car control system 400 may assign the elevator car in the robot exclusive mode in response to the hall call for boarding of the multiple robots.

In the following, an example of three robots being grouped into one group will be described. It should be noted that the three robots are set by way of example and other implementations are possible and that the following examples may be applied to grouping of two or more robots into one group.

Three Robots 200, 202, 204 Boarding One Elevator Car

As described above, any one or each of the robots 200, 202, 204 may transmit an elevator car call command (hall call) for boarding of the robots 200, 202, 204. In response to the hall call, the elevator car control system 400 may assign only one elevator car for the three robots 200, 202, 204.

The elevator car control system 400 may assign the hall call to the most appropriate elevator car (for example, elevator car 100). Here, three elevator cars may be assigned to allow boarding of all of the grouped robots, that is, all of the robots 200, 202, 204. Upon receiving the hall call, the elevator car 100 arrives at a platform where the robots 200, 202, 204 are waiting. In one embodiment, each or one of the robots 200, 202, 204 may transmit a signal indicative of a destination floor together with an elevator car call command signal, as described above.

In one embodiment, the elevator car control system 400 may assign the hall call to the elevator car based on a space occupation rate within the elevator car, a boarding capacity of the elevator car, and the number of occupants and/or the number of robots in the elevator car. The elevator car control system 400 may assign the hall call to an elevator car with occupants (and/or robots on board) corresponding to a preset ratio or less of the number of occupants to the maximum occupant capacity of the elevator car, for example, a ratio selected from among 20%, 30%, 40%, 50%, 60%, and the like of the maximum occupant capacity. The ratio of the number of occupants to the maximum occupant capacity may be set by an administrator of the elevator car control system 400. In one embodiment, the elevator car control system 400 may set the ratio of the number of occupants to the maximum occupant capacity in various ways based on a current operation mode of the elevator car. For example, the elevator car control system 400 may be configured to determine that the elevator car in the robot exclusive mode allows grouped robots corresponding to 30% or less of the maximum occupant capacity to board the corresponding elevator car. The elevator car control system 400 may be configured to determine that the elevator car in the robot/passenger share mode allows grouped robots corresponding to 20% or less of the maximum occupant capacity to board the corresponding elevator car.

The elevator car control system 400 may assign the hall call to an elevator car with occupants (and/or robots on board) corresponding to a preset ratio of the boarding weight to the maximum weight capacity of the elevator car, for example, a ratio selected from among 20%, 30%, 40%, 50%, 60%, and the like of the maximum weight capacity. The ratio of the boarding weight to the maximum weight capacity may be set by an administrator of the elevator car control system 400. In one embodiment, the elevator car control system 400 may set the ratio of the boarding weight to the maximum weight capacity in various ways based on a current operation mode of the elevator car. For example, the elevator car control system 400 may set the ratio to 30% for the elevator car in the robot exclusive mode and 20% for the elevator car in the robot/passenger share mode.

When the maximum occupant capacity of a certain elevator car is 20 occupants, the elevator car control system 400 may assign a hall call for boarding of three robots to an elevator car with no more than four occupants (and/or robots on board) and/or no more than two robots on board. For example, when the maximum occupant capacity of the elevator car is 20 occupants, the elevator car control system 400 may assign a hall call to an elevator car in which the weight of items (including occupants and robots) on board is detected to be less than or equal to a preset weight. The elevator car control system 400 may assign the hall call to an elevator car in which the weight of items on board is detected to be less than or equal to a preset weight or a preset percentage of the maximum weight capacity of the elevator car. The elevator car control system 400 may assign the hall call to an elevator car with as few people on board as possible. When there is an elevator car that satisfies the above examples, the elevator car control system 400 may determine that there is an elevator car that all of the grouped robots 200, 202, 204 can board and may assign the hall call to the corresponding elevator car.

The assigned elevator car 100 arrives at the platform and the door of the elevator car 100 opens. The elevator car 100 may transmit a boarding allowable signal to the robot control system 300. The elevator car 100 may transmit the boarding allowable signal to the robot control system 300 through the elevator car control system 400. The robot control system 300 may transmit the boarding allowable signal to the robots 200, 202, 204.

When the grouped robots 200, 202, 204 board one elevator car 100, any one of the robots 200, 202, 204 may transmit a robot under-boarding signal for boarding the elevator car 100 to the elevator car control system 400 through the robot control system 300. In one embodiment, a firstly boarding robot may transmit the robot under-boarding signal to the elevator car control system 400. Accordingly, a robot closest to the door of the elevator car may transmit the robot under-boarding signal to the elevator car control system 400. In addition, the robot that transmitted the hall call may transmit the robot under-boarding signal to the elevator car control system 400. A secondly or thirdly boarding robot may board the elevator car 100 without transmission of a specific signal. The last boarding robot may transmit a boarding completion signal to the elevator car control system 400. The last boarding robot may transmit the boarding completion signal to the elevator car control system 400 through the robot control system 300.

After boarding of the robots 200, 202, 204 is completed, the door of the elevator car is closed and the elevator car 100 moves toward a destination floor. A destination floor registration signal (car call) may be transmitted together with a hall call when any one of the robots 200, 202, 204 transmits the hall call, or the robots 200, 202, 204 may transmit a car call to the elevator car control system 400 through the robot control system 300 after boarding the elevator car 100.

The door of the elevator car opens when the elevator car 100 arrives at the destination floor. The elevator car control system 400 may transmit an alighting allowable signal to the robot control system 300. The robot control system 300 may transmit the alighting signal to the robots 200, 202, 204. Among the robots 200, 202, 204, a firstly alighting robot may transmit an under-alighting signal to the elevator car control system 400. Secondly and thirdly alighting robots may alight from the elevator car 100 without transmitting a specific signal. The last alighting robot may transmit an alighting completion signal to the elevator car control system 400.

Three Robots 200, 202, 204 Boarding Two Elevator Cars

In one embodiment, the elevator car control system 400 may determine that there is no elevator car available to all of the grouped robots. Upon determining that there is no elevator car satisfying a preset reference, the elevator car control system 400 may determine that no elevator cars are available for all of the grouped robots.

Upon determining that there is no elevator car available to all of the grouped robots, for example, the elevator car control system 400 may determine that there is an elevator car available to two robots. Upon determining that there is an elevator car available to two robots, the elevator car control system 400 may assign an elevator car available to two robots and an elevator car available to one robot to the group of robots 200, 202, 204 and move the group of robots 200, 202, 204 to a platform where the robots 200, 202, 204 are located. The elevator car control system 400 may transmit information about the elevator car available to two robots and the elevator car available to one robot to the group of robots 200, 202, 204. The elevator car control system 400 may transmit the information about the elevator car available to two robots and the elevator car available to one robot to the robot control system 300. The robots 200, 202, 204 may be specified to board the elevator car available to two robots or the elevator car available to one robot.

The elevator car control system 400 may assign a hall call to an elevator car with occupants (and/or robots on board) corresponding to a preset ratio or less of the number of occupants to the maximum occupant capacity of the elevator car, for example, 20%, 30%, 40%, or 50% or less of the maximum occupant capacity. Here, the ratio of the number of occupants to the maximum occupant capacity may be greater than a ratio set to determine that there is an elevator car available to three robots. For example, the elevator car control system 400 may be set to determine that an elevator car with occupants (and/or robots on board) corresponding to 20% of the maximum occupant capacity is an elevator car available to three robots. The elevator car control system 400 may be configured to determine that an elevator car with occupants (and/or robots on board) corresponding to 30% of the maximum occupant capacity is an elevator car not available for three robots but available to two robots. The ratio of the number of occupants to the maximum occupant capacity may be set by an administrator of the elevator car control system 400. The elevator car control system 400 may assign the hall call to an elevator car that has a preset ratio of the boarding weight to the maximum weight capacity of the elevator car, for example, 20%, 30%, or 40% of the maximum weight capacity. Here, the ratio of the boarding weight to the maximum weight capacity will be greater than a ratio set to determine that there is an elevator car available to three robots. The ratio of the boarding weight to the maximum weight capacity may be set by an administrator of the elevator car control system 400.

The elevator car control system 400 may assign an elevator car available to two robots and an elevator car available to one robot to the grouped robots 200, 202, 204. The elevator car control system 400 may transmit information about the assigned elevator cars to the robot control system 300. The robot control system 300 may determine which of the grouped robots 200, 202, 204 may board the elevator car available to two robots and may transmit a signal for controlling the grouped robots 200, 202, 204 to the grouped robots 200, 202, 204. For example, the robot control system 300 may specify which robots will board which elevator car.

The assigned two elevator cars arrive at a platform. Each of the elevator cars arriving at the platform may transmit a boarding allowable signal to the robot control system 300. Each of the elevator cars may transmit the boarding allowable signal to the robot control system 300 through the elevator car control system 400. The robot control system 300 may transmit the boarding allowable to robot(s) designated to board the corresponding elevator car among the robots 200, 202, 204.

In one embodiment, it is assumed that two of the robots 200, 202, 204 board the elevator car available to two robots. In one embodiment, a firstly boarding robot may transmit a robot under-boarding signal to the elevator car control system 400. A secondly boarding robot may board the elevator car available to two robots without transmitting a specific signal. The last boarding robot may transmit a boarding completion signal to the elevator car control system 400. The last boarding robot may transmit the boarding completion signal to the elevator car control system 400 through the robot control system 300.

In one embodiment, it is assumed that one of the robots 200, 202, 204 boards the elevator car available to one robot. One robot may transmit a robot under-boarding signal to the elevator car control system 400. Upon completion of boarding, the robot may transmit a boarding completion signal to the elevator car control system 400.

Each elevator car arrives at a destination floor. The elevator car control system 400 may transmit an alighting allowable signal to the robot control system 300. The robot control system 300 may transmit an alighting signal to the robot(s) in an elevator car that has arrived at the destination floor. When two robots are on board, a firstly alighting robot may transmit an under-alighting signal to the elevator car control system 400. A secondly alighting robot may alight from the elevator car without transmitting a specific signal. The last alighting robot may transmit an alighting completion signal to the elevator car control system 400. When an elevator car with one robot on board arrives at the destination floor, the robot alights from the elevator car through the same process as a normal alighting process.

In one embodiment, a robot having alighted from the elevator car prior to other robots may be controlled by the robot control system 300 to wait for robots that arrive later. For example, since the elevator car control system 400 may transmit an alighting allowable signal to the robot control system 300 and the robot control system 300 may transmit the alighting allowable signal to the robot(s), the robot control system 300 may determine which robot first arrived at the destination floor. The robot control system 300 may transmit a wait signal to the robot having first alighted from the elevator car to wait for a robot later arriving at the destination floor. The elevator car control system 400 may receive an alighting completion signal from the robot that later arrives at the destination floor and may transmit the alighting completion signal to the robot control system 300.

The robot control system 300 may transmit a waiting-release signal to the firstly arriving robot based on the alighting completion signal from the robot that later arrives at the destination floor.

Three Robots 200, 202, 204 Boarding Three Elevator Cars

Upon determining that there is no elevator car available to all of the grouped robots, for example, the elevator car control system 400 may determine whether there is an elevator car available to two robots. Upon determining that there is no elevator car available to two robots, the elevator car control system 400 may perform assignment of an elevator car for each of the robots 200, 202, 204.

The elevator car control system 400 may transmit information about assigned elevator cars to the robot control system 300. The robot control system 300 may transmit the received information about the assigned elevator cars to the robots 200, 202, 204. A technique for allowing each of the three robots 200, 202, 204 to board an elevator car, move to a destination floor and alight from the elevator car may be realized by a typical technique in the art and will not be described in detail.

In one embodiment, a robot having alighted from the elevator car prior to other robots may be controlled by the robot control system 300 to wait for robots that arrive later. For example, since the elevator car control system 400 may transmit an alighting allowable signal to the robot control system 300 and the robot control system 300 may transmit the alighting allowable signal to the robot(s), the robot control system 300 may determine which robot has first arrived at the destination floor. The robot control system 300 may transmit a wait signal to the robot having first alighted from the elevator car to wait for robots later arriving at the destination floor. The elevator car control system 400 may receive an alighting completion signal from the last robot that arrives at the destination floor and may transmit the alighting completion signal to the robot control system 300. The robot control system 300 may transmit a waiting-release signal to the robots having already arrived at the destination floor based on the alighting completion signal from the last robot.

In one embodiment, when a hall call is assigned to an elevator car for all or two of the grouped robots 200, 202, 204, another hall call may not be assigned to the elevator car prior to boarding completion of the corresponding robots 200, 202, 204 in the elevator car. This is because the corresponding robots 200, 202, 204 may not be able to board the corresponding elevator car, if another hall call is assigned to the corresponding elevator car and another passenger (and/or robot) is allowed to board the corresponding elevator car prior to the corresponding robots 200, 202, 204.

Controlling Three Robots 200, 202, 204 to Arrive at Destination Floor Within Preset Time When multiple robots 200, 202, 204 board different elevator cars, the elevator car control system 400 may assign and control the elevator cars such that each of the robots 200, 202, 204 arrives at a destination floor substantially at the same time (for example, with a preset time difference) or within a preset period of time.

In one embodiment, the elevator car control system 400 may control movement of the multiple elevator cars to a hall call-registered floor (for example, a floor on which a group of robots is waiting) by matching the number of grouped robots with the number of robots that the multiple elevator cars can accommodate. For example, when a group of three robots is waiting on the hall call-registered floor, the elevator car control system 400 may control an elevator car available to two robots and an elevator car available to one robot to arrive at the hall call-registered floor within a preset period of time. Alternatively, the elevator car control system 400 may control three elevator cars each available for one robot to arrive at the hall call-registered floor within a preset period of time.

For this control, in one embodiment, the elevator car control system 400 may determine the number of robots that can be accommodated in each elevator car and may calculate a period of time for each elevator car to arrive at the hall call-registered floor from a current location thereof, in response to hall calls from the grouped robots. After calculating the period of time for each elevator car to arrive at the hall call-registered floor, the elevator car control system 400 may group elevator cars that have the smallest time difference in arrival at the hall call-registered floor. Since the number of robots that can be accommodated in each elevator car is determined, the elevator car control system 400 controls movement of multiple elevator cars to the hall call-registered floor by matching the number of grouped robots with the number of robots that can be accommodated by the elevator cars having the smallest difference in arrival at the hall call-registered floor. The elevator car control system 400 may not assign a subsequent hall call to the multiple elevator cars moving to the hall call-registered floor.

After the multiple robots have separately boarded the multiple elevators, the elevator car control system 400 controls the multiple elevator cars to move to the destination floor and controls the multiple elevators not to be assigned different hall calls prior to arrival at the destination floor.

Figure 2:
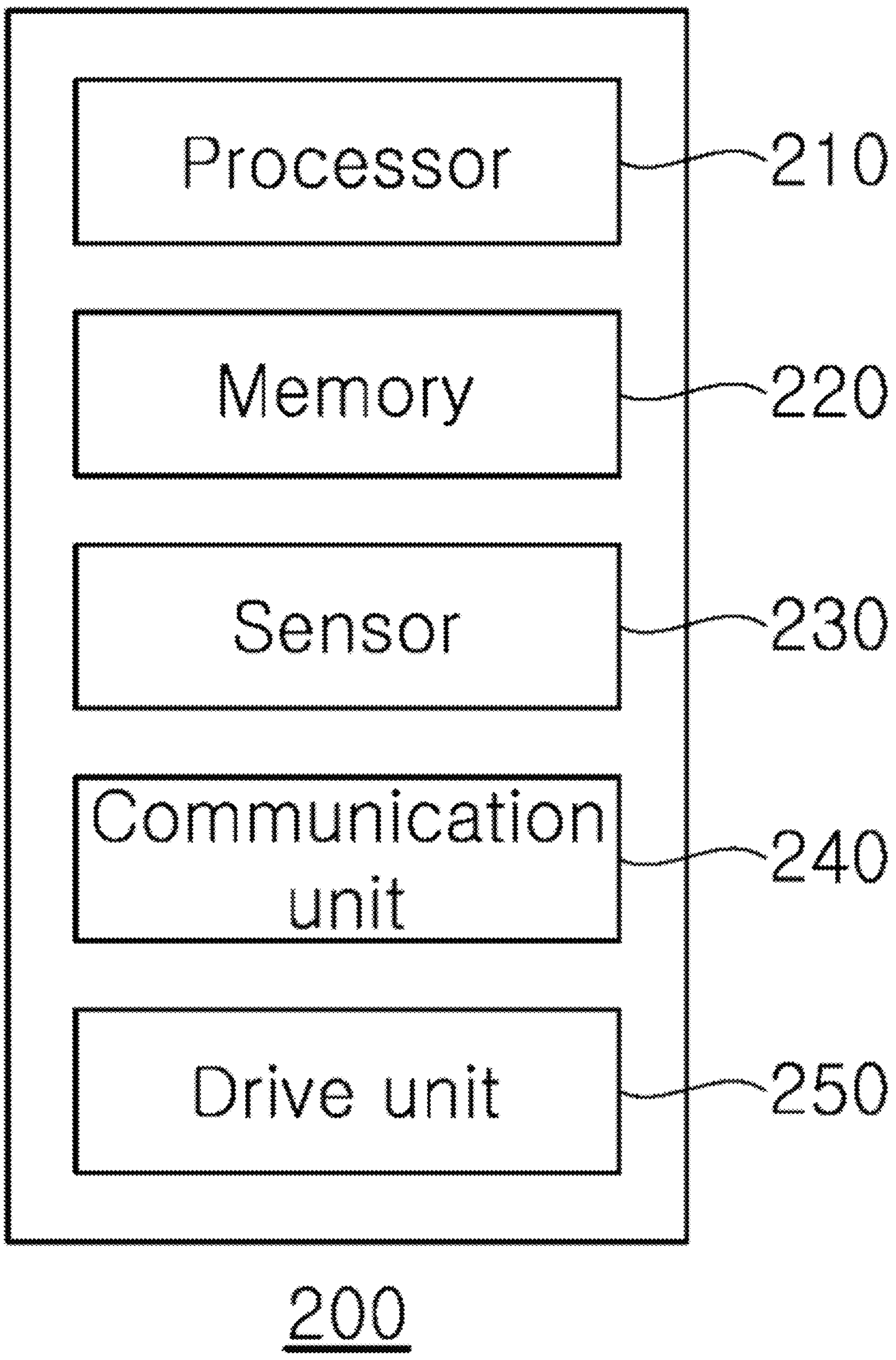
FIG. 2 is a block diagram of an elevator car-boarding robot according to an embodiment of the present disclosure.

FIG. 2 is a block diagram of a robot 200 of one of elevator car-boarding robots according to one embodiment of the present disclosure.

Referring to FIG. 2, the robot 200 includes a processor 210, a memory 220, a sensor 230, a communication unit 240, and a drive unit 250. The processor 210 may be configured to control the robot, such as moving, mapping, data processing, and the like, and to control components of the robot 200 upon execution of instructions stored in the memory 220. The processor 210 may control the communication unit 240 to transmit the signals described above to the elevator car control system 400 through the robot control system 300. The processor 210 may also transmit information collected by the sensor 230 or information regarding movement of the robot 200, such as boarding, alighting, or waiting, to the elevator car control system 400 through the robot control system 300.

The processor 210 may control the robot 200 based on information sensed by the sensor 230. In one embodiment, the processor 210 may be an application specific integrated circuit (ASIC), digital signal processor (DSP), digital signal processing device (DSPD), programmable logic device (PLD), field programmable gate array (FPGA), controller, microcontroller, microprocessor, or any other form of processor or controller for performing functions.

The sensor 230 may be configured to collect data required for autonomous driving of the robot 200. The robot 200 may use the sensor 230 to detect opening/closing of an elevator door after the elevator car 100 arrives at a boarding area or a destination floor. Based on opening/closing of the elevator door, the robot 200 may perform boarding/alighting from the elevator car 100. Information detected by the sensor 230 may be transmitted to the elevator car control system 400 through the robot control system 300 via the communication unit 240.

The communication unit 240 may be a configuration through which the robot 200 communicates with another device, such as the robot control system 300. The communication unit 240 may be a hardware module, such as an antenna, a data bus, a network interface card, a network interface chip, and a networking interface port, of the robot 200, or a software module, such as a network device driver or a networking program, which transmits and/or receives data and/or information. The drive unit 250 may be configured to enable movement of the robot 200 and may include hardware, such as motors and wheels, to accomplish this operation.

Figure 3:
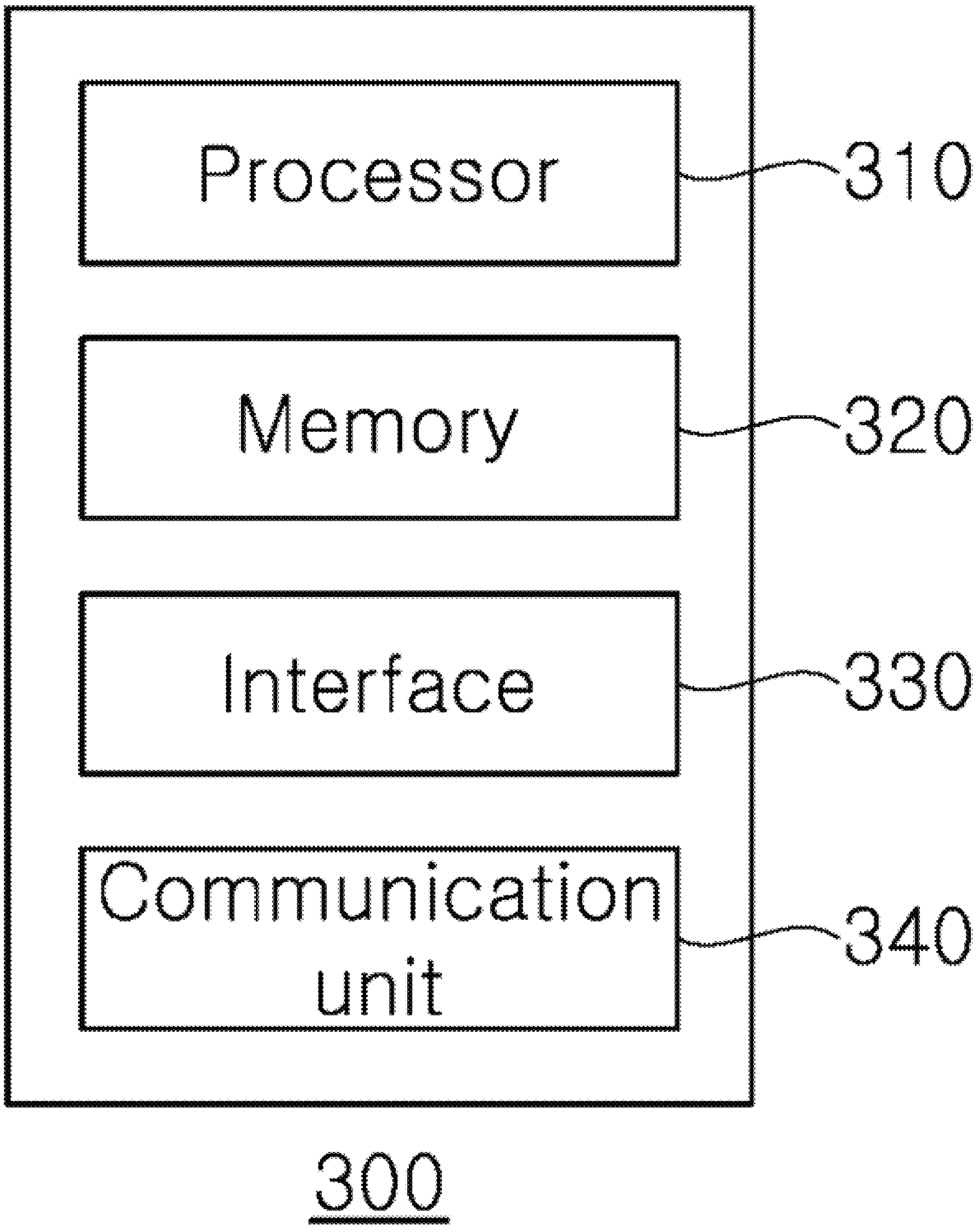
FIG. 3 is a block diagram of a robot control system according to an embodiment of the present disclosure.

FIG. 3 is a block diagram of a robot control system 300 according to one embodiment of the present disclosure. The robot control system 300 may be a device that controls movement of the robot 200 and provision of services by the robot 200 in a building. The robot control system 300 may call the elevator car 100 to move the robot 200 to a destination floor through communication with the elevator car control system 400. The robot control system 300 may control the robot 200 to recognize and board a called elevator car 100 and may control the robot 200 to alight from the elevator car 100 at a destination floor. The robot control system 300 may include at least one computing device and may be realized by a server located within or outside a building. The robot control system 300 may also be realized by a cloud server (system). The robot control system 300 may be configured to transmit signals for controlling the elevator car 100 to the elevator car control system 400 based on signals or information received from the robot 200.

Referring to FIG. 3, the robot control system 300 may include a processor 310, a memory 320, an interface 330, and a communication unit 340. Since the processor 310, the memory 320 and the communication unit 340 may be similar to the processor 210, the memory 220, and the communication unit 240 of the robot 200, detailed descriptions thereof will be omitted. The interface 330 may include an input device, such as a keyboard, a mouse, a touch panel and a microphone, and/or an output device, such as a display and a speaker.

Figure 4:
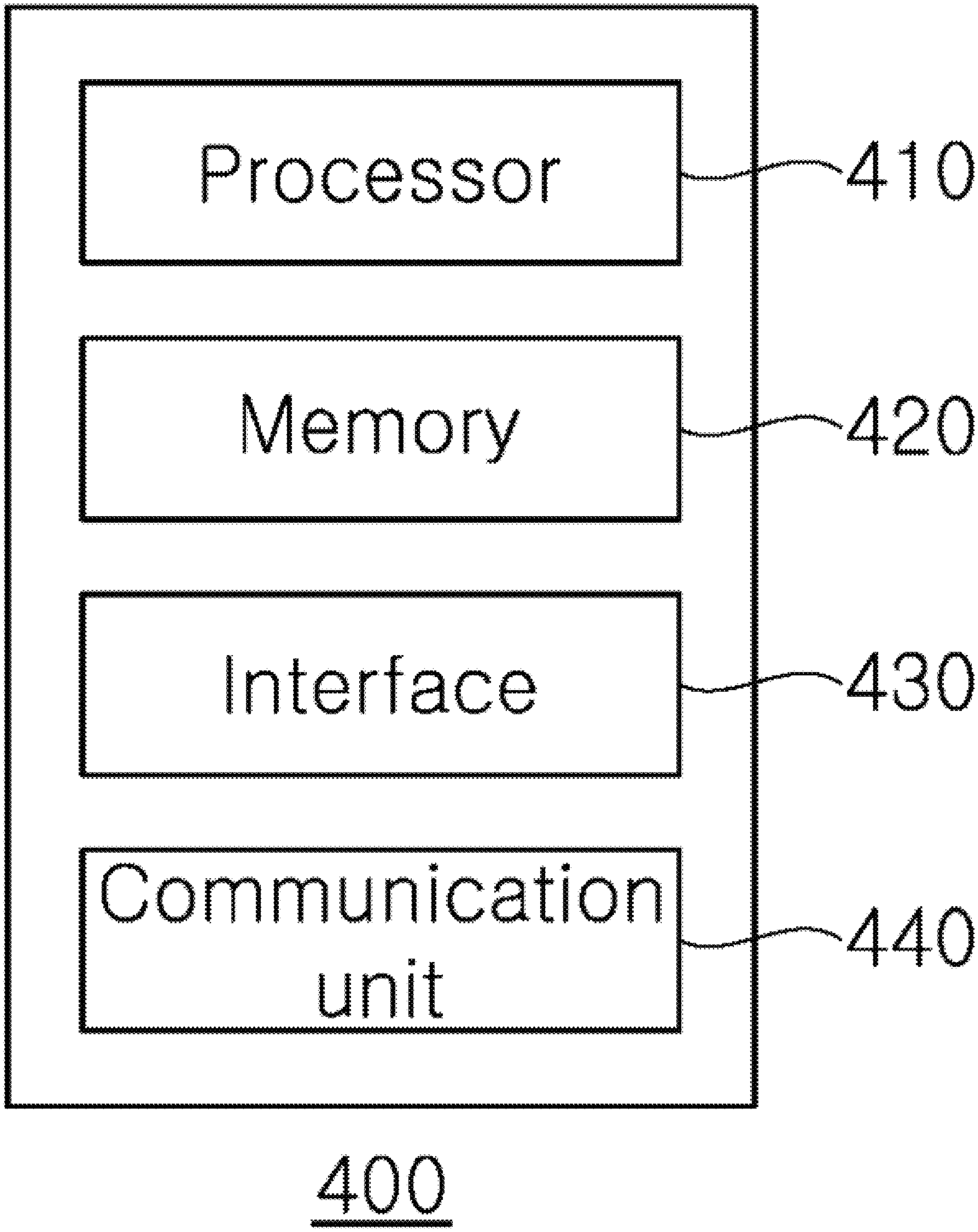
FIG. 4 is a block diagram of an elevator car control system according to an embodiment of the present disclosure.

FIG. 4 is a block diagram of an elevator car control system 400 according to one embodiment of the present disclosure. The elevator car control system 400 may be a device for controlling calls for the elevator car 100 and movement of the elevator car 100 (or generating signals to control movement of the elevator car 100), which travels (for example, ascends or descends) within a building. The elevator car control system 400 may include at least one computing device and may be realized by a computer system located within or outside the building. The elevator car control system 400 may be distinguished from a control panel that directly controls the elevator car 100. The elevator car control system 400 may transmit signals for controlling the elevator car 100 to the control panel. Alternatively, the elevator car control system 400 may include the control panel. The elevator car control system 400 may receive information from a camera 110 and/or a weight sensor 120.

Referring to FIG. 4, the elevator car control system 400 includes a processor 410, a memory 420, an interface 430, and a communication unit 440. Since the processor 410, the memory 420, and the interface 430 may be similar to the processor 310, the memory 320, the interface 330, and the communication unit 340, detailed descriptions thereof will be omitted.

Figure 5:
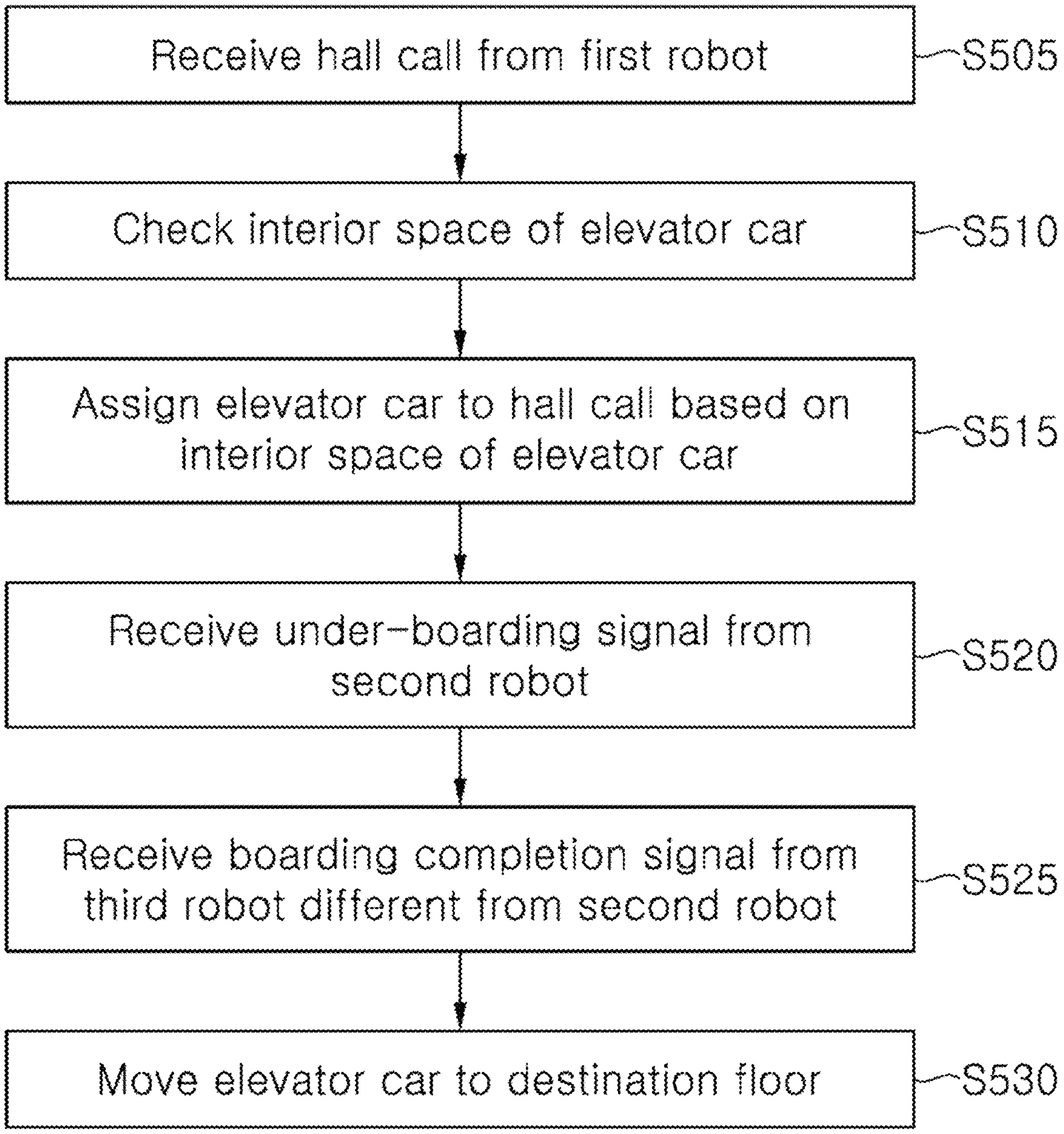
FIG. 5 is a flowchart of an elevator car control method according to an embodiment of the present disclosure.

FIG. 5 is a flowchart of an elevator car control method according to an embodiment of the present disclosure. FIG. 5 illustrates a method for assigning an elevator car to a group of multiple robots to allow the grouped robots to board the elevator car and moving the elevator car to a destination floor.

Referring to FIG. 5, in step S505, the elevator car control system 400 receives a hall call from a first robot. The first robot may be any one robot included in a group of multiple robots. The hall call may include an indicator indicating the number of grouped robots and a destination floor. Reception of the hall call from the first robot by the elevator car control system 400 may include reception of the hall call by the elevator car control system 400 through the robot control system 300.

In step S510, the elevator car control system 400 checks an interior space of the elevator car. The elevator car control system 400 may obtain an image of the interior space of each of the multiple elevator cars from a camera disposed inside each of the elevator cars. Based on the interior images of the elevator cars, the elevator car control system 400 may determine the number of robots that each of the elevator cars can accommodate.

In step S515, the elevator car control system 400 assigns an elevator car to the hall call. As described above, the elevator car control system 400 may assign one elevator car or multiple elevator cars to the hall call based on the number of grouped robots and the number of robots that each of the elevator cars can accommodate.

In step 520, the elevator car control system 400 receives an under-boarding signal from a second robot. The second robot may be any one robot included in the group of multiple robots. The first robot and the second robot may be the same or different. The second robot may be a firstly boarding robot in the group of multiple robots.

In step S525, the elevator car control system 400 receives a boarding completion signal from a third robot different from the second robot. The third robot may be the last boarding robot in the group of multiple robots.

In step S530, the elevator car control system 400 moves the elevator car to the destination floor.

Figure 6:
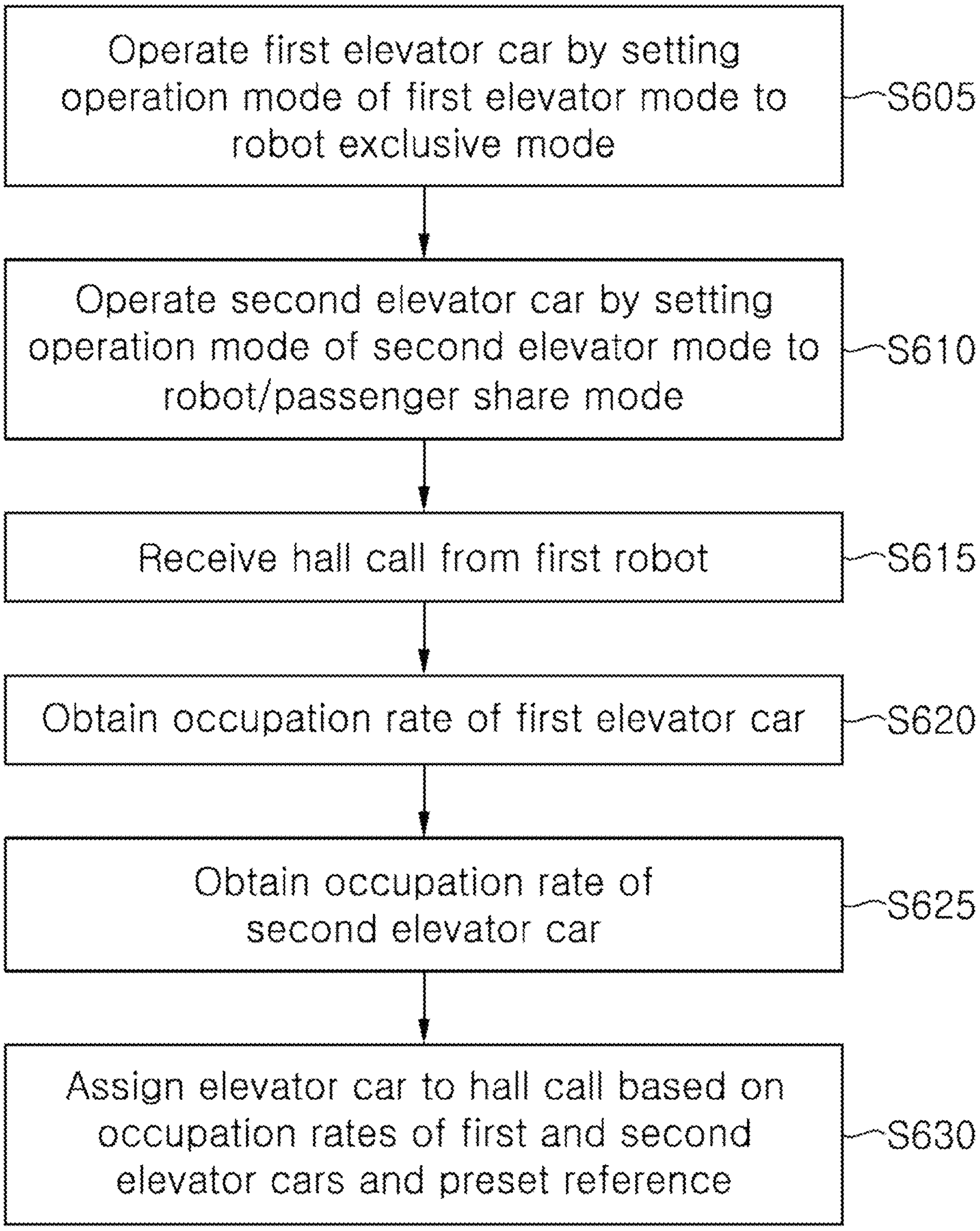
FIG. 6 is a flowchart of an elevator car control method according to an embodiment of the present disclosure.

FIG. 6 is a flowchart of an elevator car control method according to an embodiment of the present disclosure. FIG. 6 illustrates a method of assigning an elevator to multiple robots in a group.

In step S605, the elevator car control system 400 operates a first elevator car by setting an operation mode of the first elevator car to a robot exclusive mode. The first elevator car may be at least one of the multiple elevator cars.

In step S610, the elevator car control system 400 operates a second elevator car by setting the operation mode of the second elevator car to a robot/passenger share mode. The second elevator car may be at least one of the multiple elevator cars.

In step S615, the elevator car control system 400 receives a hall call from a first robot. The first robot may be any one robot included in the group of multiple robots. The hall call may include an indicator indicating the number of grouped robots and a destination floor.

In step S620, the elevator car control system 400 obtains an occupation rate of the first elevator car. The elevator car control system 400 may obtain an image of an interior space of each of the multiple elevator cars from a camera disposed inside each of the elevator cars. The elevator car control system 400 may obtain an occupation rate in the first elevator car from an interior image of the first elevator car.

In step S625, the elevator car control system 400 obtains an occupation rate of the second elevator car. The elevator car control system 400 may obtain the occupation rate of the second elevator car from an interior image of the second elevator car.

In step S630, the elevator car control system 400 assigns an elevator car to the hall call based on the occupation rate of the first elevator car, the occupation rate of the second elevator car, the operation modes, and a preset reference.

Figure 7:
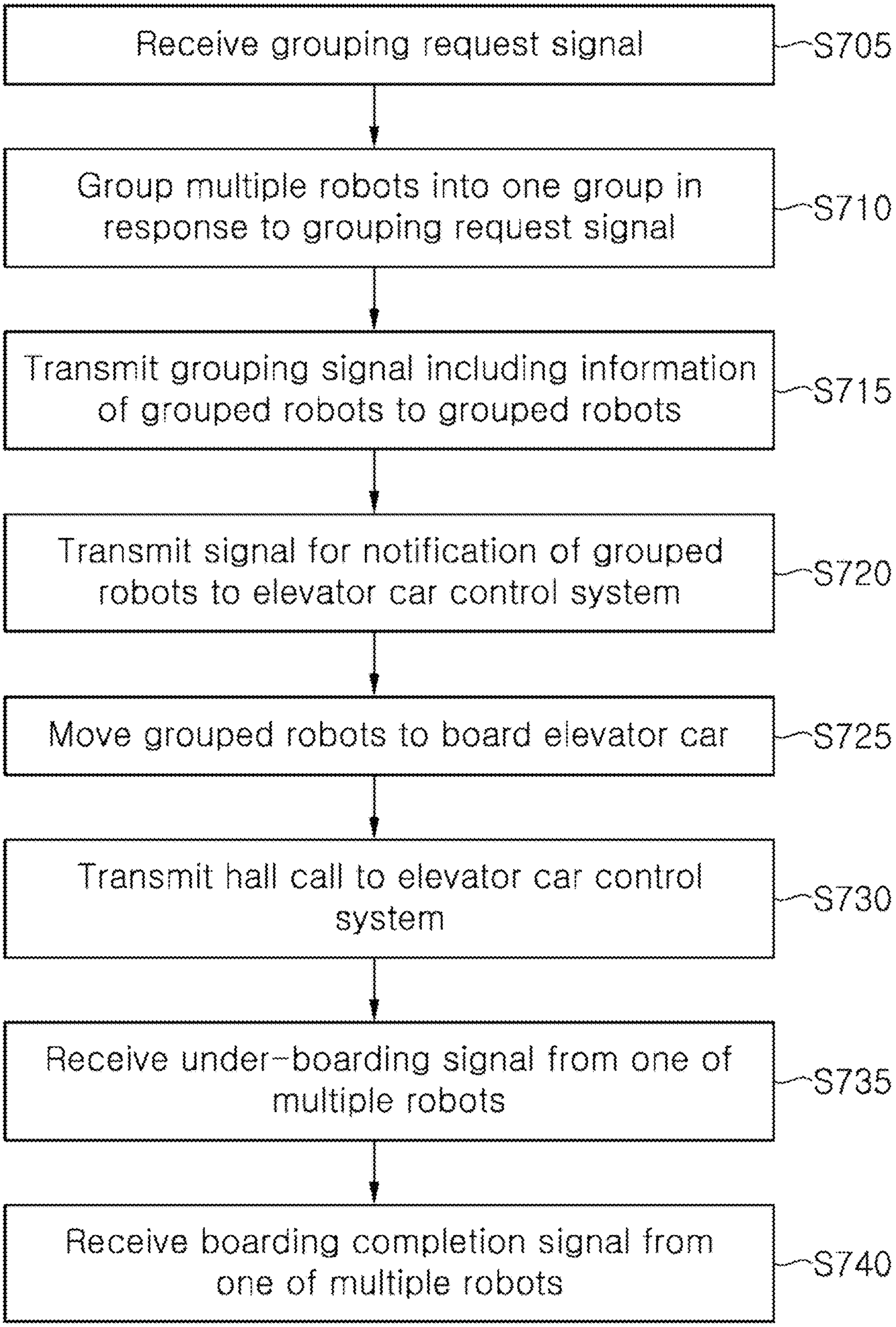
FIG. 7 is a flowchart of an elevator car control method according to an embodiment of the present disclosure.

FIG. 7 is a flowchart of an elevator car control method according to an embodiment of the present disclosure. FIG. 7 illustrates a method of assigning an elevator car to multiple robots in a group and allowing the grouped robots to board the elevator car.

In step S705, the robot control system 300 receives a grouping request signal. The grouping request signal may include an item carrying signal. The item carry signal may include the number of items. Based on the number of items and the number of items that one robot can carry, the robot control system 300 may group multiple robots into one group. The robot control system 300 may receive a grouping signal from an external source. The grouping signal may include robot information (e.g., robot IDs) and task information (e.g., a destination, a task, and the like). The grouping signal may include information indicating which robots have been grouped. The robot control system 300 may transmit a signal for designating a robot which will transmit a hall call separately from the grouping signal to the grouped robots or only to a designated robot.

In step S710, the robot control system 300 groups the multiple robots into one group in response to the grouping request signal. The robot control system 300 may group the multiple robots into one group based on the number of items and the number of items that one robot can carry.

In step S715, the grouped robots transmit a grouping signal including information about the grouped robots. The grouping signal may include robot information (e.g., robot IDs) and task information (e.g., a destination, a task, and the like). The grouping signal may include information indicating which robots have been grouped. The grouping signal may include a signal for designating which robot will transmit a hall call among the grouped robots.

In step S720, the robot control system 300 transmits a signal to the elevator car control system 400 to notify the elevator car control system 400 of the grouped robots. Accordingly, the elevator car control system 400 may determine which robots have been grouped.

In step S725, the robot control system 300 moves the grouped robots to board the elevator car.

In step S730, the robot control system 300 transmits a hall call to the elevator car control system 400. The hall call may include an indicator indicating the number of grouped robots. The robot control system 300 may receive the hall call from one robot or multiple robots. In one embodiment, when the robot control system 300 receives hall calls from the multiple robots, the robot control system 300 may filter out duplicate hall calls and transmit one hall call to the elevator car control system 400.

In step S735, the robot control system 300 receives an under-boarding signal from one of the multiple robots in the group.

In step S740, the robot control system 300 receives a boarding completion signal from one of the multiple robots. The robot transmitting the under-boarding signal and the robot transmitting the boarding completion signal may be different.

Herein, transmission of a signal by a robot to the elevator car control system may include transmission of a signal to the elevator car control system through the robot control system. In other words, reception of a signal from the robot may include reception of the signal by the elevator car control system through the robot control system.

Herein, "occupation rate" of an elevator car may include the occupation rate of a space in the elevator car occupied by items (including, for example, both humans and robots) in the elevator car. The "occupation rate" may include a ratio of the weight of items (including, for example, both humans and robots) in the elevator car to the maximum weight capacity of the elevator car. The "occupation rate" may include the ratio of the number of occupants and/or robots of items (including, for example, both humans and robots) in the elevator car to the maximum occupant capacity in the elevator car.

The methods according to the present disclosure may be realized by code that can be written on a processor-readable recording medium and thus read by a processor of a server, system, equipment, computer, or integrated control unit which is used by a certain entity. The processor-readable recording medium may be any type of recording devices in which data is stored in a processor-readable manner. The processor-readable recording medium may include, for example, ROM, RAM, CD-ROM, a magnetic tape, a floppy disk, and an optical data storage device, and may be realized in the form of a carrier wave transmitted over the Internet. In addition, the processor-readable recording medium may be distributed over multiple computer systems connected to a network such that processor-readable code is written thereto and executed therefrom in a decentralized manner.

The devices and methods described above may be realized by a hardware component, a software component, and/or a combination thereof. For example, the devices and components described in the embodiments may be realized using one or more general-purpose computers or special-purpose computers, such as a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications executable on the operating system. The processing device may also access, store, manipulate, process, and generate data in response to execution of software. For convenience of understanding, the processing device is sometimes described as utilizing a single processing element, but a person having ordinary skill in the art will recognize that the processing device may include multiple processing elements and/or multiple types of processing elements. For example, the processing device may include multiple processors, or may include one processor and one controller. Further, another processing configuration such as a parallel processor is possible.

The software may include computer programs, code, instructions, or a combination thereof. The software may configure the processing device to operate as desired, or may independently or collectively instruct the processing device. The software and/or data may be permanently or temporarily embodied in any type of machine, component, physical device, virtual equipment, computer storage medium or device, or transmitted signal wave, for interpretation by the processing device or for providing instructions or data to the processing device. The software may also be distributed across networked computer systems to be stored or executed in a decentralized manner. The software and the data may be stored on one or more computer-readable recording media.

The embodiments of the present disclosure may be practiced in a distributed computing environment where certain tasks are performed by remote processing devices connected via a communication network. In the distributed computing environment, program modules may be located on both local and remote memory storage devices.

Although the exemplary embodiments of the present disclosure have been described with reference to the drawings as above, it should be understood that the foregoing embodiments are provided for illustration only and are not to be in any way construed as limiting the present disclosure, and that various modifications, changes, alterations, and equivalent embodiments can be made by those skilled in the art without departing from the spirit and scope of the disclosure. For example, even when the invention described herein is performed in a different order than described herein and/or the components of the described systems, structures, devices, circuits, and the like are combined or assembled in a different form than described herein or are substituted or replaced by other components or equivalents thereto, suitable results can be achieved.

Therefore, other implementations, other embodiments, and equivalents to the appended claims fall within the scope of the claims.

LIST OF REFERENCE NUMERALS

100: Elevator car
200: Robot
300: Robot control system
400: Elevator car control system
210, 310, 410: Processor
220, 320, 420: Memory
230: Sensor
240, 340, 440: Communication unit
250: Drive unit
330, 430: Interface

The invention claimed is:

1. An elevator car control method comprising:
- receiving a hall call from a first robot, the hall call comprising an indicator indicating a number of two or more robots and a destination floor;
- checking interior spaces of elevator cars based on interior images of the elevator cars;
- assigning an elevator car to the hall call based on the interior spaces of the elevator cars;
- receiving an under-boarding signal from a second robot;
- receiving a boarding completion signal from a third robot different from the second robot; and
- moving the elevator car to the destination floor.

2. The elevator car control method according to claim 1, wherein the first robot and the second robot are different robots.

3. The elevator car control method according to claim 1, wherein the first robot and the second robot are the same robot.

4. The elevator car control method according to claim 1, further comprising:
- controlling the elevator car so as not to be assigned in response to a hall call from a passenger after assigning the elevator car.

5. The elevator car control method according to claim 1, wherein the number of two or more robots is N, N being 3, and the step of assigning an elevator car based on the interior spaces of the elevator cars comprises:
- determining that there is no elevator car available to N robots;
- determining that there is an elevator car available to N−1 robots; and
- assigning the elevator car available to N−1 robots.

6. The elevator car control method according to claim 1, wherein the hall call further comprises information about the first to third robots,
- the elevator car control method further comprises: receiving hall calls from the second and third robots, and
- the step of assigning an elevator car based on the interior spaces of the elevator cars comprises assigning the elevator car in response to only one of the hall calls from the first to third robots.

7. The elevator car control method according to claim 1, wherein the step of assigning an elevator car to the hall call based on the interior spaces of the elevator cars comprises assigning the elevator car to the hall call by taking into account an operation mode of the elevator car, the operation mode comprising a robot exclusive mode and a robot/passenger share mode.

8. The elevator car control method according to claim 7, wherein the step of assigning an elevator car to the hall call based on the interior spaces of the elevator cars comprises prioritizing assignment of an elevator car in the robot exclusive mode.

9. An elevator car control method comprising:
- operating a first elevator car by setting an operation mode of the first elevator car to a robot exclusive mode;
- operating a second elevator car by setting an operation mode of the second elevator car to a robot/passenger share mode;
- receiving a hall call from a first robot, the hall call comprising an indicator indicating a number of two or more robots and a destination floor;
- obtaining an occupation rate of the first elevator car;
- obtaining an occupation rate of the second elevator car; and
- assigning an elevator car to the hall call based on at least one of the occupation rate of the first elevator car, the occupation rate of the second elevator car, the operation modes, and a preset reference.

10. The elevator car control method according to claim 9, further comprising:, after assigning an elevator car to the hall call,
- receiving an under-boarding signal from a second robot of the two or more robots;
- receiving a boarding completion signal from a third robot of the two or more robots different from the second robot; and
- moving the elevator car to the destination floor.

11. A control method by a robot control system, comprising:
- receiving a grouping request signal;
- grouping multiple robots into one group in response to the grouping request signal;
- transmitting a grouping signal including information about the grouped robots;
- transmitting a signal for notification of the grouped robots to an elevator car control system;
- moving the grouped robots to board an elevator car;
- transmitting a hall call to the elevator car control system, the hall call comprising an indicator indicating a number of grouped robots; and
- receiving an under-boarding signal from one of the multiple robots; and
- receiving a boarding completion signal from one of the multiple robots.

12. The control method according to claim 11, wherein the step of transmitting a hall call to the elevator car control system comprises:

receiving hall calls from the multiple robots, the hall calls comprising robot information; and filtering out duplicate hall calls among the hall calls received from the multiple robots based on the grouping signal and the hall calls.

13. The control method according to claim 11, further comprising:

transmitting a robot selection signal to either the grouped robots or any one of the grouped robots to select a robot that will transmit the hall call, after grouping the multiple robots into one group in response to the grouping request signal.

14. An elevator car control system comprising a processor and a memory configured to store instructions, the instructions, when executed, enabling the processor to:

receive a hall call comprising an indicator indicating a number of two or more robots and a destination floor;

determine occupation rates of elevator cars based on internal images of the elevator cars;

assign an elevator car to the hall call based on the occupation rates of the elevator cars;

receive an under-boarding signal from a robot;

receive a boarding completion signal from a robot different from the robot; and move the elevator car to the destination floor.

15. The elevator car control system according to claim 14, wherein the processor is configured so as not to assign the elevator car in response to a hall call from a passenger after assigning the elevator car.

16. An elevator car control system comprising:

multiple elevator cars;

a camera disposed within each of the elevator cars and acquiring an interior image of each of the elevator cars;

a processor generating a control signal to control operation of each of the elevator cars in response to a request signal received from a robot, wherein the processor is configured to: receive a hall call from one robot, the hall call comprising a destination floor and an indicator indicating multiple robots included in one group; assign an elevator car for transporting the multiple robots to the hall call based on the interior image of each of the elevator cars; and allow the elevator car for transporting the multiple robots to accommodate the multiple robots and to move to the destination floor.

* * * * *